Aug. 11, 1942.                M. A. GLEESON                    2,293,017
                                  VALVE
                           Filed Jan. 26, 1940            2 Sheets-Sheet 2
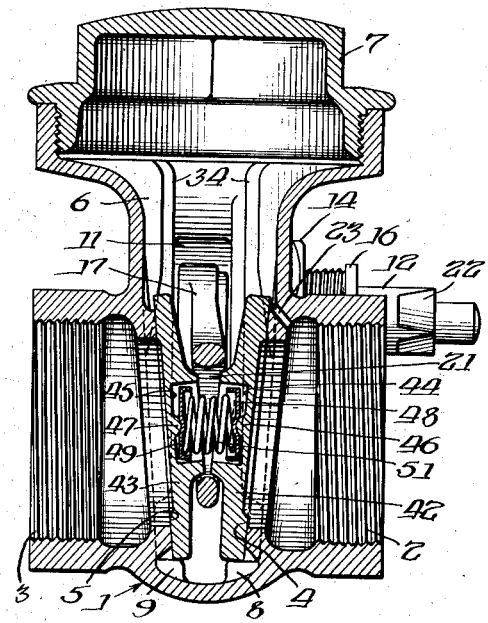
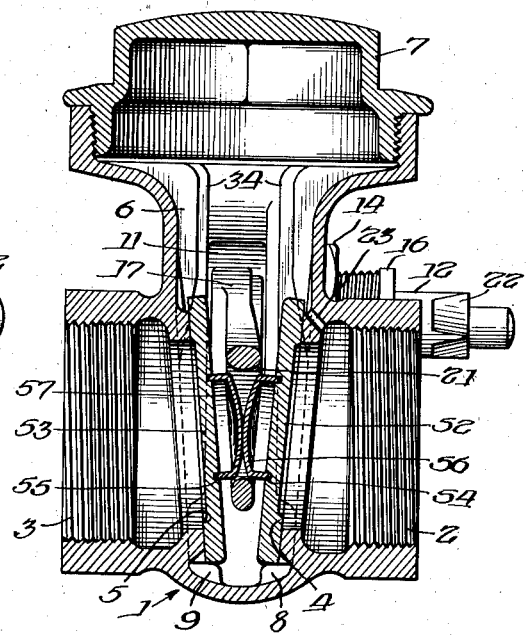
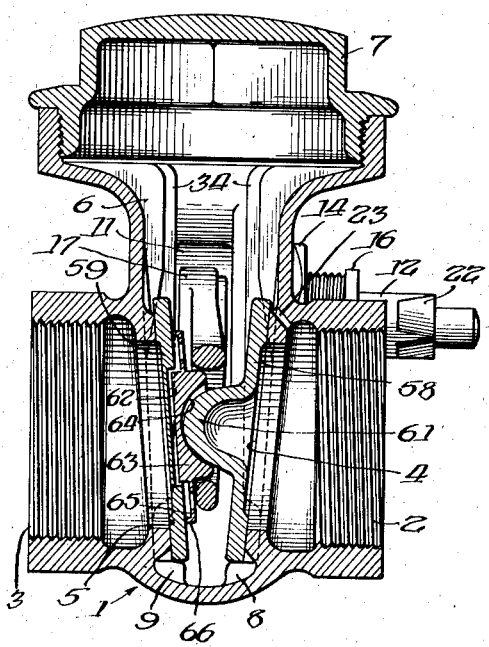
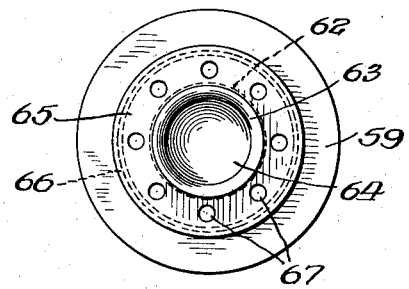
Inventor:
Murray A. Gleeson
By: Joseph O. Lange, Atty.

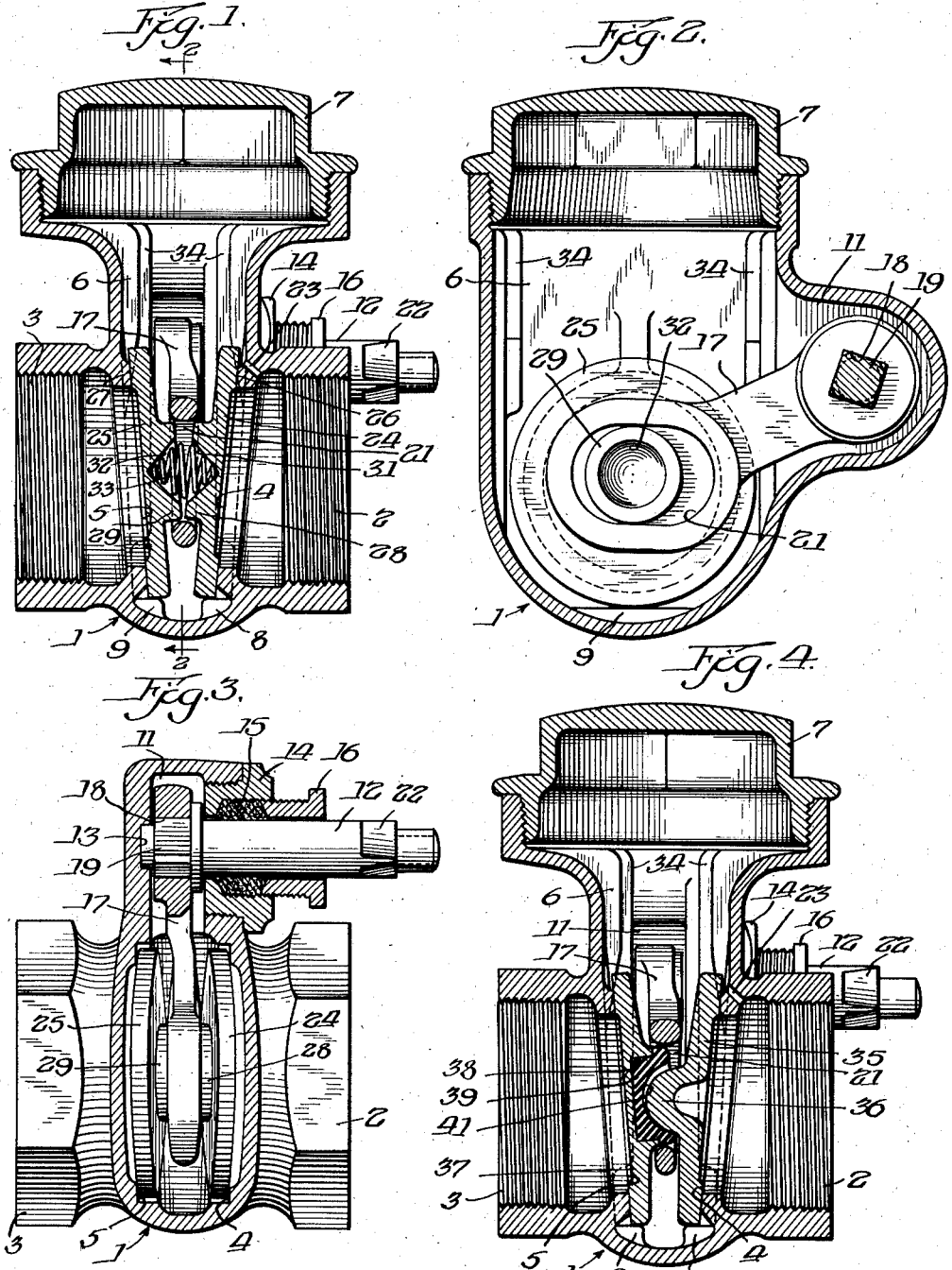

Patented Aug. 11, 1942

2,293,017

UNITED STATES PATENT OFFICE 2,293,017

VALVE

Murray A. Gleeson, Chicago, Ill., assignor to Crane Co., Chicago, Ill., a corporation of Illinois Application January 26, 1940, Serial No. 315,710

1 Claim. (Cl. 251—18)

This invention relates to valves and more particularly to the type known to those skilled in the art as quick-opening valves in which a closure member comprising a pair of preferably angularly positioned discs are adapted to be moved transversely of the line flow so as to open and close the valve.

Previously known constructions of the many varieties of quick-opening valves of the double disc wedge type have presented serious objectionable characteristics from both the manufacturing and operating or service standpoints. In the past, the production of such valves has been made difficult and relatively expensive because of the precision required in the broaching and other machining of the operating parts of the valve which function to wedge the discs between their seats. During the operation of the valves, objectionable sticking of the discs between the seats has frequently been experienced to the extent that the valves were difficult to open and close with the result that frequently the valves were not fully closed, causing wire-drawing or cutting of the seats and discs thus causing premature wear.

It is believed, and actual tests tend to substantiate such belief, that the sticking of the closure members or discs between their seats is caused by the combined effect of the wedging mechanism and the entrapment therebetween of relatively high fluid pressure within the body or casing of the valve proper. At the instant the discs are wedged between their seats, water hammer developed by the sudden stoppage of fluid flow within the pipe line forces the disc or closure member, immediately adjacent the inlet, away from its seat sufficiently to allow an additional quantity of fluid to surge into the valve casing whereafter the inlet disc is forced with an increased load against its seat (inlet side) thus trapping additional fluid at relatively high pressure within the casing and between the discs. The usual non-resilient disc wedging device of prior constructions such as, for example, a metal ball and socket arrangement on the back or juxtapositioned surfaces of each of the discs, together with the seating effect of the entrapped line fluid have made it necessary to provide a powerful and uneconomical cam construction, gear, or other power gaining mechanism for the purpose of wedging and unwedging or releasing the discs between their seats. While various means have been used to overcome the problem above referred to, it appears that no one previously understood just exactly the reason for the difficulties referred to.

Therefore, in understanding the problem and its cause, I have for an object of my invention the provision of a quick-opening valve which will be relatively inexpensive to manufacture and which, in a more important sense, will require a comparatively small amount of effort in order to operate the valve from open to closed position and vice versa.

One of the primary objects of the invention lies in the provision of a valve of the character described having either a member which is resilient by reason of its construction, or a member which is resilient because of its composition per se, such member being interposed between the halves of the closure member to yieldingly urge the halves comprising the complementary closure members or discs toward their respective seats.

Another object is to provide stops for the closure members which prevent movement of the closure members past a fully closed position and into a wedged positoion between the respective seats of the closure member halves.

A still further important object of the invention lies in the provision of a pressure relieving or equalizing passageway interconnecting the interior of the valve casing with the valve inlet port when the valve is in the closed position.

Another object is to provide in general a valve of the character described having a relatively small body or casing whereby pipe strains and the distortion due to water hammer are less likely to cause significant changes in the seating surfaces and thus adversely affect the desired tightness of the valve.

These and other objects and advantages of the present invention will or should become more readily apparent from the reading of the following description taken in connection with the drawings, in which Fig. 1 is a vertical sectional view of a valve embodying my invention in which a double-conical coiled wire spring having the apexes positioned outwardly is provided to yieldingly urge the identical disc halves toward their respective seats.

Fig. 2 is a vertical sectional view taken substantially on the line 2—2 of Fig. 1.

Fig. 3 is a partly sectional plan view of the valve showing in detail the preferred construction of the closure member actuating mechanism.

Fig. 4 is a vertical sectional view of a modified form of my invention disclosing as a material, rubber, for example, or like resilient material, inserted between the discs.

Fig. 5 is a vertical sectional view of another modified valve construction embodying my invention in which a cylindrical coiled wire spring is provided between the discs or closure members.

Fig. 6 is a vertical sectional view of a still further modified construction which provides cup-shaped spring members between the discs.

Fig. 7 is a vertical sectional view of another modification of my invention which discloses a metallic ball and socket joint between the discs which is adapted to urge the discs resiliently toward their respective seats.

Fig. 8 is a rear view of the socket disc shown in Fig. 7.

Like reference numerals refer to like parts throughout the drawings.

The valve body comprises a casing, generally designated 1, having an inlet 2 and an outlet 3 which are suitably tapped for connection in a fluid pipe line. However, if desired, other well known means for attaching the valve to a pipe line may be utilized, for example, a flanged connection. The casing is also provided with a pair of angularly positioned seats of annular form, 4 and 5 respectively, surrounding the inlet and outlet ports. Between the said seats an upwardly extending body cavity 6 is provided to contain the valve closure member and its actuating mechanism in the open position of the valve. A cap 7 suitably attached to the open upper portion of the body cavity 6 is provided for purposes of assembly, repair or adjustment of the valve operating parts. Within the casing and immediately below the valve seats a pair of preferably integral closure member stops 8 and 9 are positioned.

and 4, the outermost or front portions of the discs are each provided with the contact or seating surfaces 26 and 27 which respectively contact the seats 4 and 5 when the valve is in the closed position (as shown) to effectively stop the flow of fluid through the valve. The back sides or rear portions of the said discs are provided with the concentric bosses 28 and 29, each of the latter having the conical recesses 31 and 32 to receive and to retain the double-conical coiled wire spring 33 in a slightly compressed position between the discs.

At this point, it appears to be important to emphasize that even in the seated position the discs 24 and 25 do not contact each other and thus are not wedged together between the valve seats. This is significant, for those who are skilled in the art of double disc valves are well aware that even under the most favorable conditions the inlet half of the closure member, though tightly wedged against its seat, is seldom fluid tight if the fluid pressure within the valve body is relieved. The fluid tightness of the valve is usually dependent upon a complete seal being effected at the outlet seat which, in the present case, is seat 5. In the event of a large pressure differential existing between the inlet 2 and the outlet 3, when the valve is closed, the fluid load upon the outlet disc 25 is sufficient to maintain a tight seal at the seat 5. However, if the pressure differential is only slight the spring 33 assists the fluid load in maintaining the outlet leak-proof position forms, from the construction of the valve previously described lies in arrangement of the back side faces of closure member discs. In the present modified form a ball and socket joint is provided between the discs. The inlet disc 35 being formed preferably with an integral ball 36 and the outlet disc 37 being provided with a recess 38 into which may be fitted a preformed rubber or the like resilient insert 29 having a hemispherical recess 41 for the reception of the ball 36 on the disc 35. This construction similarly to the valve shown in Figs. 1, 2 and 3 provides resilient urging of the discs toward their seats when the valve is in the closed position.

Referring now to Fig. 5, a further modification is shown. The discs 42 and 43 provided herein are identically formed with the recesses 44 and 45, respectively, in their back side surfaces. The bottoms of the recesses are provided with the relatively small hemispherical projections 46 and 47 which cooperate with the cup-shaped spring retainers 48 and 49, the latter having recesses in the exterior of their bottom portions which are adapted to form ball and socket joints with the projections 46 and 47. A cylindrical coiled wire spring 51 is provided between the discs with its end portions retained by the cups 48 and 49 to resiliently urge the discs toward their seats.

In Fig. 6 I have shown another modification of my invention and I provide therein identical discs 52 and 53 having the annular grooves 54 and 55 in their back side surfaces for the reception of the rim portions of the spring metal cups 56 and 57. The exterior slightly bulged bottom surfaces of the cups 56 and 57 contact each other with slight compression but with sufficient force to assure that each disc is normally maintained against its seat when the valve is in the closed position.

Fig. 7 discloses a further modified resilient type of ball and socket joint between the discs 58 and 59 of the closure member. Discs 58, similarly to disc 36 (Fig. 4) is preferably provided with an integral ball 61. The outlet disc 59 is provided with a shallow concentric recess 62 for the reception of the base portion of the socket member 63. As more clearly shown in Fig. 8, the socket member 63 has a hemispherical recess 64 for cooperation with the ball 61 and on the periphery of the member 63 a relatively thin transversely extending annular flange 65 is provided having an angularly extending foot portion 66 the end of which bears against the back side surface of the disc 59. Preferably, although not necessarily required, the flange 65 may be provided with a plurality of perforations 67 to enhance the flexibility of the flange, if desired.

It will be noted that no close tolerances or expensive machining or broaching operations are required in the production of valves embodying my invention. Also it should be noted that the size of the valve casing has been reduced to a minimum thereby making possible a valve which is highly resistant to the deleterious effects of pipe strains, vibration and the like abuses to which valves are frequently subjected. While I have shown and described only the preferred embodiments of my invention, it is nevertheless to be clearly understood that substantial changes and modifications may be made falling within the scope of the appended claim.

I claim:

In a valve, the combination comprising a casing having an inlet and an outlet, tapered seats surrounding the said inlet and the said outlet, a cavity between the said seats, a reciprocable closure member for the said seats within the said cavity, the said closure member comprising a pair of discs, means between the said discs for yieldingly urging the latter toward the said seats, the said latter means comprising a rubber-like cup-shaped member engaging rear portions of the said discs, closure member stop means within the said cavity, an independent passageway interconnecting the said inlet and the said cavity, the said stop means preventing closing movement of the said closure member past a fully closed position and into a wedged position, the said interconnecting passageway providing that upon closing the said valve the said cavity is relieved of line pressure trapped therewithin.

MURRAY A. GLEESON.